3,567,412
GASIFICATION OF CARBONACEOUS FUELS
Philip A. Lefrancois, Cranford, and Kenneth M. Barclay, Stockton, N.J., assignors to Pullman Incorporated, Chicago, Ill.
Filed Aug. 12, 1968, Ser. No. 751,932
Int. Cl. C10j 3/16; C10g 9/34
U.S. Cl. 48—202        20 Claims

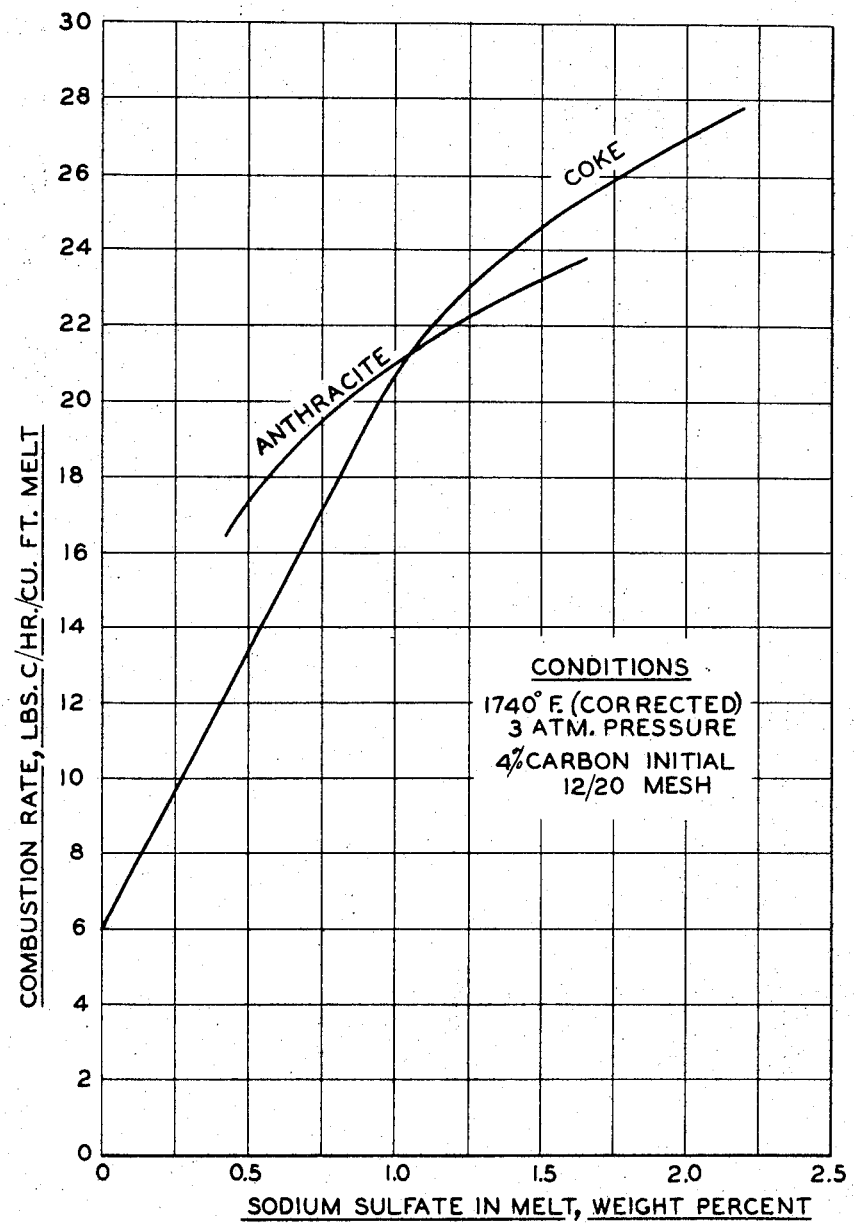

ABSTRACT OF THE DISCLOSURE

A method for improving the gasification and combustion rates of carbonaceous materials in a reaction zone containing a melt comprising essentially an alkali metal carbonate by maintaining at least a critical minimum concentration of 0.4 weight percent of sodium sulfate in the reaction melt and the viscosity of the melt is maintained between about 10 and about 150 centipoises.

---

This invention relates to an improved process for reacting carbonaceous materials. In one aspect, this invention relates to an improved process for gasification of normally liquid or solid carbon-containing material. In another aspect, this invention relates to a method for the production of hydrogen-containing gases such as mixtures of carbon oxides and methane with hydrogen, as in synthesis gases or fuel gasses, from solid or liquid carbonaceous materials in a reaction zone containing a molten medium, at improved reaction rates.

One method of producing hydrogen-rich gas suitable for use as a gas from which commercially valuable products may be synthesized is that of gasifying carbonaceous material in a molten salt medium with an oxidizing agent such as steam and recovering the gases. One such process involves establishing two reaction zones, a heat absorbing or gasifying zone where an endothermic gasification reaction takes place and a heat generating or combustion zone where an exothermic oxidation reaction takes place. The molten medium circulates between the two zones as a heat exchange medium. Into the first zone, feed is introduced with steam and in the endothermic reaction which ensues, a hydrogen-rich product gas is evolved. To supply the necessary heat to this endothermic zone, the melt containing some of the feed is circulated to a second zone in which feed is combusted with an oxygen-containing gas such as air in an exothermic reaction which increases the sensible heat of the melt heat exchange medium. The melt, upon recirculation with uncombusted feed to the gasification zone, gives up its acquired sensible heat to provide the heat required for the endothermic gasification of the feed. One difficulty encountered in this process is that a considerable portion of the carbonaceous material is consumed in the combustion zone to supply heat to the gasification reaction. However, the products of the combustion zone, namely, $CO_2$ and CO, are not the desirable hydrogen-rich gaseous products of the gasification reaction.

It has now been discovered that certain aspects of these reactions can be materially improved and the gasification reaction can be more advantageously utilized.

Accordingly, it is an object of this invention to provide an improved method of producing hydrogen-rich gas from carbonaceous materials.

It is another object of this invention to provide a method of producing hydrogen-rich gas from carbonaceous fuel in which improved reaction rates are realized.

It is another object of this invention to provide a process for producing hydrogen-rich gas from carbonaceous feed in which the carbonization reaction is more efficiently utilized and the rate of supply heat to the process is substantially improved.

It is another object of this invention to provide an agent which, when added to a process for oxidation of fuels, increases the rate of oxidation and produces a more exothermic reaction.

It is still another object of this invention to provide an agent which when added to a process for gasification of carbonaceous materials, decreases the amount of salt carryover from the system.

It is still a further object of this invention to provide a coal gasification process in which the sizes of the reaction zones are substantially reduced.

It is yet another object of this invention to provide a gasification process of improved efficiency and economy.

Various other objects and advantages of this invention will become apparent from the accompanying description and disclosure.

According to this invention, there is provided an improvement in a method for reacting carbonaceous material which comprises maintaining in the reaction zone ionized sodium sulfate catalyst at a critical minimum concentration of at least 0.04 mole percent based on carbon of the carbonaceous material. The amount of sodium sulfate can be as high as 50 mole percent or higher, however, a concentration of between about 0.07 and about 20 mole percent based on carbon is preferred. The present process provides a particular improvement in the production of synthesis gas from normally liquid or solid carbonaceous material wherein the carbonaceous material is subjected to gasification in a first reaction zone with steam in the presence of an alkali metal carbonate melt and is subjected to combustion in a second zone with air in the presence of the melt which is caused to circulate between the two zones as a means of maintaining the respective reaction temperatures. In this process the carbonaceous material is more selectively utilized to provide hydrogen-rich synthesis gas and the combustion reaction rate and the sensible heat of the melt is greatly increased by maintaining a critical minimum concentration of ionized sodium sulfate in the melt of at least 0.4 weight percent, although a concentration of between about 0.5 and 10 weight percent sodium sulfate in the melt is preferred and between about 0.5 and 6 weight percent is most preferred. Sodium sulfate concentrations as high as 16 weight percent of melt are suitably employed. It is also advantageous to maintain between about 0.5 and about 20 weight percent of solids in the melt during gasification so that the viscosity of the melt is greater than 5 and less than 2,000 centipoises, preferably a melt viscosity of between about 10 and about 150 centipoise is maintained.

In the above process the melt which serves as the heat exchange medium is predominantly a sodium or potassium carbonate melt which may contain a minor amount of metal hydroxide and/or metal oxide, particularly sodium hydroxide and/or oxide, and may contain lithium or potassium carbonate in an amount suitable to modify the thermal properties of the melt.

The ionic sodium sulfate catalyst of the melt may be added as sodium sulfate per se or it may be added as another compound which, under reaction conditions, decomposes to form sodium sulfate or reacts with other components of the reaction mixture in a way such that the cationic portion of the compound added is replaced with sodium. The inorganic sulfates or sulfites of metals such as aluminum, zinc, cobalt, barium, potassium, clacium, magnesium, lithium, iron, etc., enter into double decomposition reactions with a sodium salt such as sodium carbonate and the metals of these compounds are easily displaced by sodium present in the carbonaceous material. Thus, these metal salts can be added as the source of sodium sulfate catalyst. Organic sulfates are also suitable as a source of sodium sulfate catalyst. Illustrative of this type are urea sulfate and similar oxysulfur-containing compounds such as benzene sulfonic acid, alkyl sulfonic acids and sulfonates. An $SO_2$-rich flue gas and oxides of the above metals are also suitable sources of the sodium sulfate since these compounds combine with sodium and oxygen in the system to produce sodium sulfate. The ash produced by pyrolysis of high boiling hydrocarbons and coal is rich in metal oxide and sulfate and therefore is particularly suited as at least a partial source of sodium sulfate catalyst maintained in the melt. Since the ash also provides solids it is useful in maintaining the viscosity of the melt during gasification. It is to be understood that any combination of the above materials, as well as any of the above materials individually, can be employed to supply at least a portion of the sodium sulfate catalyst maintained in the melt.

The reaction rate affecting agents or sodium sulfate yielding compounds may be introduced into the reaction zone or zones in any suitable manner such as by impregnation of the carbonaceous material therewith, or by impregnation of the melt. In either case, the additive is dispersed throughout the reaction zone with or without the aid of mechanical agitation. A portion of the melt can be analyzed at intervals to insure proper sodium sulfate concentration and melt viscosity.

The solid carbonaceous feed material of the present invention includes any of the various grades of coal such as anthracite, subbituminous, bituminous, brown coal, cannel coal, lignite, lignitic coal, coke from coal, coke from petroleum, peat, graphite, charcoal, wood and non-woody materials. Such materials may be used in lump, granular, finely divided or pulverized form. The liquid carbonaceous feed material of the preesnt invention includes hydrocarbon mixtures derived from petroleum such as gas oils, cycle oils, naphtha, residual fractions, reduced crude, asphalt and other hydrocarbon materials including petroleum wax fractions, coal tars and pitches. The carbonaceous feed also includes hydrocarbons of the acyclic, alicyclic aliphatic and aromatic types such as heptanes, dodecanes, dodecenes, naphthalenes, kerosene and mixtures thereof. Generally the feeds of this invention include those described in U.S. 3,252,773 and U.S. 3,252,774. In two stage operations the carbonaceous material may be charged to either or both the gasification and combustion zones in admixture or separately at one or more points. Preferred operation is to introduce the carbonaceous material in finely divided or liquid form with the steam into the gasification zone.

The carbonaceous material is introduced into the gasification zone at a rate within the range from about 0.001 to about 5 pounds, preferably from about 0.2 to about 1.0 pounds, of carbonaceous material per hour per pound of molten salt. In any particular instance, the amount of carbonaceous material introduced will depend upon the percentage of carbon contained therein, it being preferred that there exist in the melt a carbon concentration of from about 0.002 to about 0.20 pound carbon per pound of melt.

The process employs a larger excess of molten salt in relation to the carbonaceous feed, the weight ratio of salt to the carbonaceous material ranging between about 2 and about 35 although higher ratios may be employed without departing from the scope of this invention.

The presence of $Na_2SO_4$ in a critical amount not less than 0.4 weight percent accelerates the combustion rate of the carbonaceous material which is favored by higher temperature and provides a more efficient source of heat supplied to melt by exothermic reaction. The catalytic function of $Na_2SO_4$ causes formation of additional quantities of $CO_2$, thus increasing the amount of sensible heat added to the melt and reducing the volume of melt circulated for normal heat requirements.

Basic reactions of the combustion zone where carbonaceous material is oxidized by air or oxygen are described by the equations $$2C + O_2 \rightarrow 2CO \qquad (1)$$

$$C + O_2 \rightarrow CO_2 + C \rightarrow 2CO \qquad (2)$$

Ionized sodium sulfate has a marked catalytic effect on combustion. Since the $Na_2SO_4$ is a liquid at reaction temperatures, it is more intimately mixed with the carbonaceous material contained in the melt than is the oxygen. The sulfate moiety in the reaction $$2C + SO_4^= \rightarrow 2CO_2 + S^= \qquad (3)$$

displays a faster rate of reaction with carbon than that of oxygen in Equations 1 and 2 and results in a higher exothermicity. The reaction of sulfide with oxygen to regenerate the sulfate catalyst $$S^= + 2O_2 \rightarrow SO_4^= \qquad (4)$$

also takes place at a faster rate than that of reactions (1) and (2). Thus the presence of $Na_2SO_4$ at the sufficient and critical level of concentration alters the basic reactions which normally take place in the combustion zone and results in a faster rate of combustion of carbon.

In addition to increasing the reaction rate, the combined reactions (3) and (4) result in supplying more sensible heat to a given volume of melt. Since the net result is the formation of $CO_2$ which provides 94 kilocalories per mole, a much more exothermic reaction than the reaction for the formation of CO which provides only 27 kilocalories per mole is realized. Therefore, any reaction which increases $CO_2$ in the product effluent, such as the present reaction between the sulfate ion and carbon which provides a gaseous effluent of about 90 percent $CO_2$, is greatly desired where an increase in sensible heat is an important consideration in a process. The ability to increase the heat supplied to a given volume of melt greatly reduces the circulation requirements of the melt to and from the endothermic gasification zone and thus provides better control of gasification temperature at optimum levels. Indirectly, the gasification rate is also enhanced by this control to optimum temperature. Since the required circulation rates of the molten salt medium between reaction zones is substantially reduced and equipment sizes and costs are similarly reduced, the initial capital expenditures are minimized as are subsequent operating costs, and a process of both improved efficiency and economy results.

Since the amount of carbonaceous combustion required to provide a given level of heat is greatly reduced by the preferential formation of $CO_2$, a greater amount of the carbonaceous material can be conserved for the more desirable gasification reaction which results in the formation of hydrogen-rich materials instead of being sacrificed to combustion for heat energy.

Improvement is also noted by increasing the viscosity of melt with solids in the gasification zone to about 10 or more centipoises, although generally a viscosity greater than 200 centipoises is not desired. The higher melt viscosity provides more intimate contact of steam with the carbonaceous material by reducing bubble size of steam passed through the melt. Thus maintaining a weight ratio of between about 1:1 and 5:1 ash:carbon in the melt is particularly preferred. In any case, it is recommended that the combined ash and carbon content of the melt be maintained below 20 weight percent, preferably below 15 weight percent, so that the viscosity of the melt will not rise above the desired levels and cause foaming.

The catalytic agent or catalyst generating agent can be introduced into a single-stage process for producing synthesis gas wherein the carbonaceous material, steam, oxygen and melt are intermixed and the gasification and combustion reactions take place simultaneously in the same zone, although a two stage process wherein gasification and combustion are carried out in separate zones, is preferred. Single-stage operation requires that substantially pure oxygen be employed instead of air which can be used in the two-stage process. The catalytic agent can also be added to the carbonaceous material when no melt is present, as for example in a power plant coal combustion process, where addition of sodium sulfate serves to increase the rate of reaction and permits reduction in the size of the reactor.

Since the preferred process of the present invention is the process where gasification and combustion are carried out in separate zones, the following description of reaction conditions separates the ranges of conditions of each zone, although for single-stage operation the ranges of the two zones can be combined. In the two-stage process the gasification reaction which results in the production of methane, hydrogen and oxides of carbon is carried out at any temperature conveniently greater than the melting point of the salt medium employed, considered from the standpoint of the viscosity of the melt under the conditions of circulation employed. Usually, the gasification melt and zone are held at a temperature of about 800° F. to about 2200° F., preferably between about 1600 and about 1900° F.

The gasification reaction can be carried out under a pressure between about 15 and about 2000 p.s.i.a. although pressures between about 100 and about 500 p.s.i.a. are more desirable.

The proportion of steam reactant introduced into the gasification zone is maintained between about 1 and about 10 moles of steam per mole of carbon with the preferred steam to carbon ratio being between about 1.1 and about 2.0 moles of steam per mole of carbon.

The combustion or oxidation reaction is carried out at an average temperature higher than that employed in the gasification zone. Generally, the exothermic combustion reaction zone is maintained at a temperature of about 30° F. to about 250° F. higher than the temperature of the endothermic gasification zone, however, as little as 10° F. difference in zone temperatures will supply sufficient heat if the melt circulation is high.

The combustion reaction can be carried out under a pressure between about 15 and about 2000 pounds per square inch, absolute. Generally, the pressure of the combustion zone is approximately the same as that of the gasification zone. The oxidant such as oxygen or air is introduced into the combustion zone as the reactant and a vaporous product effluent containing carbon dioxide and a minor portion of carbon monoxide is produced by an exothermic reaction which imparts heat to the melt. The sodium sulfate is present in the melt in a weight percent of between about 0.4 and about 16, preferably between about 0.5 and 10.

In the process of the present invention, the quantity of carbonaceous material consumed in the combustion zone is comparatively small as compared to that consumed in the gasification zone. By maximizing heat release, circulation rates are minimized. Therefore, it is desirable that the combustion of the carbonaceous material in the combustion zone result in the liberation of carbon dioxide rather than carbon monoxide in consideration of the comparatively greater heat release of the former reaction. Accordingly, the amount of oxidant introduced into the combustion zone should be governed on the basis of this concept with reasonable attention to economics in avoiding an overly large excess of oxidant in the product gases. While it is impossible to completely eliminate the presence of carbon monoxide in the products of combustion from the combustion zone, the sodium sulfate additive reduces the carbon monoxide content to a minimum and reduces the amount of this undesirable component to less than half that which would be obtained under normal operation.

As previously mentioned, the molten salt provides the medium in which the reactions take place and is circulated through the system with the carbonaceous material suspended therein. The circulation rate is that required to supply heat to the endothermic reaction zone as interrelated to the amount of heat generated within the melt by the reaction taking place in the combustion zone. The reactors containing the melt are composed of a suitable corrosion resistant material such as, for example, Monofrax A which is a high purity fused and cast refractory alumina having a dense microstructure composed of about 95 percent corundum ($\alpha$-$Al_2O_3$) and about 5 percent beta-alumina ($Na_2O \cdot 11Al_2O_3$) with traces of $SiO_2$, $Fe_2O_3$ and CaO. The approximate physical properties of Monofrax A are as follows:

Thermal conductivity (2000° F. mean temperature)— 49 B.t.u./ft.$^2$/in./° F./hr.
Percent linear expansion (2000° F. mean temperature)— 0.88
Electrical resistivity (ohm-cm. at 2550° F.)—715
Density in pounds/cu. ft.—220
Knoop hardness K–100—2205
Transverse strength—3855 p.s.i.

The following examples are presented for a better understanding of the invention and are not to be construed in any way limiting to the scope of this invention. The percentages in the following examples are in weight percent except where otherwise indicated. Example 1 illustrates the effect of coal ash additives upon gasification rates.

EXAMPLE 1

Into an Inconel two inch tubular reactor was charged about 415 grams of solid sodium carbonate. Under atmospheric pressure and at a temperature of about 1740° F. the carbonate was melted. About 4 per cent carbon, that is 20 grams of dry bituminous coal containing about 0.78 gram of ash of which about 15 percent is in the form of calcium sulfate, was added to the carbonate melt. The bituminous coal had the following analysis.

| | Percent |
|---|---|
| Fixed carbon | 58.4 |
| Volatile matter | 37.3 |
| Ash | 3.9 |

The coal particles were of 12/20 mesh size. Four separate melt mixtures were made up acording to the method described above. Mixtures of 90 parts of steam and 10 parts of nitrogen were then separately introduced into each melt mixture to produce hydrogen, carbon oxides, and methane as the gaseous products of the reaction. The following tabulation records the temperature and gasification rate of the four separate experiments carried out under atmospheric pressure. In runs Nos. 1 and 3 no ash or sodium sulfate was added to the original mixture. However, in runs Nos. 2 and 4 about 10 weight percent ash containing calcium sulfate was added to the original mixture. The calcium sulfate is converted to sodium sulfate under the reaction conditions to provide an addition of 1 weight percent sodium sulfate to the melt mixture.

| | Melt temp., ° F. | percent ash | Clasification rate |
|---|---|---|---|
| Run Number: | | | |
| 1 | 1,750 | 0 | 7.1 |
| 2 | 1,750 | 10 | 14.2 |
| 3 | 1,830 | 0 | 15.3 |
| 4 | 1,830 | 10 | 31.9 |

Gasification rates are in terms of pounds per hour of carbon gasified per cubic foot of melt. The effect of the presence of ash in the melt at the two different temperature levels is indicated by comparison of these rates. At both temperatures it is noted that the gasification rate is about doubled.

The following examples indicate the effect of sodium sulfate on combustion.

EXAMPLE 2

To 408 grams of molten sodium carbonate melt was added 4 percent anthracite coal. The anthracite of particle of 12/20 mesh particles size had the following analysis:

|  | Percent |
|---|---|
| Total carbon | 93.2 |
| Volatile matter | 0.6 |
| Metal oxides | 6.2 |

The melt was introduced into a combustion zone and the combustion zone was maintained at a presure of about 45 p.s.i.a. with a start up temperature of 1740° F. The concentration of sodium sulfate added to the melt was varied between 0.5 and 2 percent by weight (i.e. 0.28, 0.56 and 1.11 mole percent).

Air for combustion was introduced into the combustion zone at a rate of approximately 26 liters per minute, and the following rates of combustion were determined in terms of pounds of carbon combusted per hour per cubic foot of melt.

|  | Percent Na₂SO₄ in melt | Melt avg. temp., °F. | Combustion rate |
|---|---|---|---|
| Run Number: |  |  |  |
| 129 | 0 | 1,740 | 6.0 |
| 179 | 0.5 | 1,745 | 13.0 |
| 146 | 1.0 | 1,761 | 24.7 |
| 143 | 2.0 | 1,829 | 54.5 |

The rise in temperature is proportional to the amount of $CO_2$ produced by combustion. Correction of the rates to a constant average temperature of 1740° F. was made and the results on this basis are graphically shown in FIG. 1 in which the rate of combustion is related to the weight percent of sodium sulfate in melt.

EXAMPLE 3

To 408 grams of molten sodium carbonate melt was added 4 percent anthracite coal. The anthracite of particle size 12/20 mesh had the following analysis:

|  | Percent |
|---|---|
| Total carbon | 82.5 |
| Volatile matter | 5.9 |
| Metal oxides | 11.7 |

The combustion zone was maintained under 45 p.s.i.a. and at the temperatures shown in the following tabulation. The start up temperature of each run was about 1740° F. Air for combustion purposes was introduced at a rate of approximately 26 liters per minute. The amount of sodium sulfate added to the melt was varied from 0.5 to 1.5 percent. The rates of combustion reported in the following tabulation were determined in pounds of carbon combusted per hour per cubic foot of melt. The combustion rate with 0% of added sodium sulfate at 1740° F. was estimated from plotted data to be 8.

|  | Percent Na₂SO₄ in melt | Melt avg. temp., °F. | Combustion rate |
|---|---|---|---|
| Run Number: |  |  |  |
| 190 | 0.5 | 1,760 | 19.7 |
| 191 | 1.0 | 1,808 | 32.2 |
| 193 | 1.5 | 1,843 | 43.3 |

Correction of the rates to a constant average temperature of 1740° F. was made. The results are graphically presented in FIG. 1 which relates rate of combustion to the weight percent sodium sulfate in the melt.

EXAMPLE 4

To about 400 grams of molten sodium carbonate melt was added 4 percent of the bituminous coke used in Example 2. This mixture was subjected to combustion at a temperature of about 1740° F. with an air rate of 26 liters per minute. The combustion rate of the coke under these conditions was 6.0 pounds of carbon consumed per hour per cubic foot of melt.

To another 400 gram portion of sodium carbonate melt containing 4 percent of this coke, 2 percent calcium sulfate was added and combustion of the coke was conducted under the same conditions as the first portion except that a marked increase in temperature was noted. The combustion rate was determined as being 25 pounds of carbon per hour per cubic foot of melt corrected to 1740° F. An improvement of four times the combustion rate at comparable conditions with the addition of the calcium sulfate was demonstrated.

As previously mentioned, the addition of the sulfates or ash may be from an external source. On the other hand, additives such as ash may be formed in situ within the melt itself as the course of the reaction proceeds.

Where solid carbonaceous material is first subjected to gasification and subsequently to combustion, ash from the gasification reaction tends to accumulate in the melt. Such ash tends to build up within the system as the reaction proceeds and excessive amounts of ash cause foaming in the gasification zone. Accordingly, prior art methods have taught the use of high operating temperatures in order to maintain the ash-containing melt in a less viscous state. Other methods have taught intermittent or continuous withdrawal of a portion of an ash-rich melt from the process as a means of minimizing ash build-up, while others have taught the replacement of the entire molten salt medium upon its reaching a certain ash concentration.

It has now been discovered that the process is advantageously carried out at increased combustion rates by operating within certain limits of ash concentration in the melt even to the extent that such concentrations of ash are attained by adding ash to the melt prior at the beginning of operations. Such initial ash concentrations are preferentially greater than those which would result at the end of the processs if the process were carried to completion in a batch-wise operation at the conventional initial concentration of carbonaceous material within the melt. The combustion rate which is enhanced by the sodium sulfate catalyst also is improved by the amount of sodium sulfate contained in the ash and the gasification reaction is also somewhat improved by the increase in melt viscosity resulting from the ash concentration.

EXAMPLE 5

The favorable effect on combustion rate by the presence of bituminous coal ash in the sodium carbonate melt is shown in the following examples. In all runs, the same coke was used at a concentration of 4 percent in the melt and other factors were held constant. The results are indicated by comparative combustion rates, expressed in terms of pounds per hour of carbon consumed per cubic foot of melt.

|  | Percent ash | Combustion rate |
|---|---|---|
| Run Number: |  |  |
| 9,823 | 0 | 5.1 |
| 9,838 | 0.33 | 6.5 |
| 9,837 | 2.47 | 8.5 |
| 9,829 | 10.0 | 10.1 |
| 9,839 | 20.0 | 12.5 |

Inasmuch as addition of coke to the extent of approximately 4 percent of the melt produces about 0.33 percent ash in the melt at the end of the normal run, these data indicate that decidedly advantageous combustion rates are realized if, to the original melt, ash is added to a concentration greater than that which would result from combustion of the feed during the normal course of the reaction at 4 percent coke. Advantageous results are obtained with an initial bituminous ash content in the melt from about 0.5 to about 20 percent of the mix, preferably from about 2 percent to about 10 percent by weight.

The percentage of ash which can be advantageously added to the molten reaction mix is limited by the resulting viscosity of the mixture. Prohibitive viscosities are reached in certain instances above about 16 percent ash in a molten salt containing 4 percent coal. It has been discovered in this respect that the effect of lignite ash within these aforesaid limits of concentration is greater than the effect of ash produced from anthracite or bituminous coal and that lignite ash tends to produce a smaller increase in melt viscosities than do comparable quantities of ash from bituminous and anthracite coal.

EXAMPLE 6

The following examples indicate the comparative effectiveness of ash from different sources with respect to enhancement of combustion rates. In all instances bituminous coke was combusted as hereinbefore described (4 percent in sodium carbonate melt), the runs having been conducted at the temperatures indicated with the effect of two types of ash being determined.

| Ash added to melt | Melt temp., °F. | Combustion rate |
|---|---|---|
| 2% bituminous ash | 1,761 | 14.5 |
| 2% lignite ash | 1,761 | 23.6 |

Combustion rates are expressed in pounds per hour of carbon consumed per cubic foot of melt and percentage by weight percent.

EXAMPLE 7

To illustrate the additive effect of lignite ash with respect to the effect of that ash already formed in the melt from the combustion of the coal contained in the melt, the following runs were made. Coal was combusted as above described in a sodium carbonate melt, the runs being conducted at the temperature indicated.

| Feed | Percent Ash from feed | Percent Lignite ash added | Melt temp., °F. | Combustion rate |
|---|---|---|---|---|
| Anthracite | 2 | 0 | 1,933 | 26 |
| Do | 2 | 4.4 | 1,933 | 70+ |
| Bituminous | 2 | 0 | 1,731 | 17.8 |
| Do | 2 | 4.4 | 1,731 | 44.3 |

Combustion rates are expressed in pounds of carbon consumed per hour per cubic foot of melt.

In all instances, the ash upon analysis, whether from anthracite, bituminous or lignite coals, was determined as containing calcium sulfate or sodium sulfate, in terms of its total sulfur composition. Lignite ash may be considered as containing about 40–45 percent metal sulfate based upon its total sulfur content.

To test the efficacy of the cricical minimum and larger amounts of sodium sulfate in promoting combustion, a mixture of carbonaceous material and sodium sulfate was prepared and the combustion rate of this mixture was compared with that of an unmixed sample. The following example illustrates the marked increase in combustion rate of the mixed sample.

EXAMPLE 8

Two 1 x 1 inch pellets of sub-bituminous coke (Elkol) were formed. One pellet, which weighed 12.64 grams, was impregnated with 0.06 gram (0.04 mole percent) of $Na_2SO_4$ in aqueous solution.

The remaining pellet, which weighed 12.08 grams was not impregnated.

Both pellets were placed in an oven and heated to 900° F. in a nitrogen atmosphere (2 liters/minute of nitrogen) and dried. Air was then introduced at a rate of 2 liters/minute over a period of about 1.5 hours during which the temperature in the furnace increased from 900° F. to 1700° F.

After 1.5 hours, the introduction of air was continued and the sample pellets were held at 1700° F. for one hour. The pellets were then cooled to room temperature in a stream of nitrogen. Powder ash which had formed on the surface of the cooled pellets was removed and the pellets were reweighed. The impregnated sample had a weight of 7.21 grams indicating that 43% combustion had taken place. The second, non-impregnated sample had a weight of 8.17 grams indicating that 32 percent combustion had taken place. Thus, the addition of only 0.04 mole percent $Na_2SO_4$ to the carbonaceous material had the effect of raising the amount combusted by 11 percent.

Another coke pellet of the same material was prepared weighing 6.78 grams. This pellet was impregnated with 0.3 gram (0.37 mole percent, 4.2 weight percent) of sodium sulfate. The impregnated sample was then subjected to the same treatment as the two samples above. The cooled pellets after combustion and cooling was found to have a weight of 1.88 grams indicating 72 percent combustion.

It is to be understood that although most of the above examples are drawn to the combustion of coal in a molten sodium carbonate medium any of the carbonate melts or mixtures thereof as previously described can be substituted in any of the above examples and any of the combustible carbonaceous materials may be substituted as feed to the reaction zones. Similarly, while enhancement of combustion rates has been discussed in terms of the effect of sodium sulfate per se or sodium sulfate as existing in ash, any sodium sulfate source as previously defined may be used.

Additional beneficial effects were determined as accruing from the addition of the sodium sulfate to the reaction melt besides those exemplified. For example, the sodium sulfate catalyzed melt decreases the melt carry-over of gases evolved during gasification, particularly, in this respect, decreasing carryover of sodium oxide and sodium hydroxide.

Numerous alterations and modifications of the process of this invention as described may become apparent to those skilled in the art without departing from the scope of this invention.

Having thus described our invention, we claim:

1. In a process for the oxidation of carbonaceous material contained in a molten alkali metal carbonate melt, the improvement which comprises: oxidizing the carbonaceous material with an oxidizing agent in the presence of sodium sulfate; and maintaining at least a critical minimum concentration of 0.04 mole percent sodium sulfate based on the carbon of the carbonaceous material in the oxidation zone.

2. In a process for the oxidation of carbonaceous material contained in a molten alkali metal carbonate melt, the improvement which comprises: oxidizing the carbonaceous material with an oxidizing agent in the presence of sodium sulfate maintained in the melt at least at a critical minimum concentration of 0.4 weight percent of the melt in the oxidation zone.

3. The process of claim 2 wherein the concentration of sodium sulfate is maintained between about 0.5 and about 10 weight percent in the melt.

4. The process of claim 2 wherein sodium sulfate is added to the oxidation zone to maintain a concentration of sodium sulfate in the melt between 0.4 and about 16 weight percent.

5. The process of claim 2 wherein at least a portion of the sodium sulfate is formed in situ in the oxidation zone from a compound selected from the group consisting of a sulfate and a sulfite of aluminum, zinc, cobalt, barium, potassium, calcium, magnesium, lithium, iron, organic sulfonic acids and sulfonates, sulfur dioxide gas and the ash residue from the combustion of carbonaceous material and mixtures thereof.

6. The process of claim 2 wherein at least a portion of the sodium sulfate is supplied to the oxidation zone by the ash combustion product of carbonaceous material selected from the group consisting of coal, coke, and high boiling liquid hydrocarbons.

7. In a process for producing hydrogen-containing gas from the endothermic reaction of a carbonaceous material and steam in a gasification zone containing an alkali metal carbonate metal, oxidizing the unreacted carbonaceous material contained in the melt with an oxidant in an oxidation zone to provide exothermic heat of reaction to the melt and recirculating the heated melt to the gasification zone, the improvement which comprises: maintaining a concentration of from 0.4 weight percent to about 16 weight percent of sodium sulfate in the melt in the oxidation zone.

8. The process of claim 7 wherein between about 0.5 to about 20 weight percent solids, in the form of ash from the combustion of carbonaceous material, are present in the melt in the gasification zone.

9. The process of claim 7 wherein the combined ash and carbon content of the melt is less than 20 weight percent.

10. The process of claim 9 wherein the combined ash and carbon content of the melt is less than 15 weight percent.

11. The process of claim 7 wherein sodium sulfate is maintained at a concentration of between about 10 and about 600 weight percent of the total weight of carbonaceous material in the molten salt.

12. The process of claim 11 in which the sodium sulfate, or sodium sulfate yielding compound, is added to at least one of the reaction zones comprising the gasification zone and the oxidation zone.

13. The process of claim 11 wherein sodium sulfate is added to maintain a weight ratio of sodium sulfate in the melt between about 0.5 and about 10 weight percent.

14. The process of claim 11 wherein a sodium sulfate yielding compound is added to maintain a weight percent of sodium sulfate in the melt between about 0.5 and about 10 weight percent and wherein the sodium sulfate yielding compound is selected from the group consisting of a sulfate and a sulfite of aluminum, zinc, cobalt, barium, potassium, calcium, magnesium, lithium, and iron, organic sulfonic acids and sulfonates, sulfur dioxide gas and the ash residue from the combustion of carbonaceous material and mixtures thereof.

15. The process of claim 11 wherein at least a portion of the sodium sulfate is added as the ash combustion product of a carbonaceous material.

16. The process of claim 15 wherein the combustion product is lignite ash.

17. The process of claim 15 wherein the combustion product is bituminous ash.

18. The process of claim 15 wherein the combustion product is anthracite ash.

19. In a process for producing hydrogen-containing gas from the endothermic reaction of a carbonaceous material and steam in a gasification zone containing an alkali metal carbonate melt, oxidizing the unreacted carbonaceous material contained in the melt with an oxidant in the oxidation zone to provide exothermic heat of reaction to the melt and recirculating the heated melt to the gasification zone, the improvement which comprises: maintaining a concentration of from 0.4 weight percent to about 16 weight percent of sodium sulfate in the melt in the oxidation zone and maintaining the viscosity of the melt in the gasification zone between about 10 and about 150 centipoises by regulating the amount of solids in the gasification zone.

20. In a process for producing hydrogen-containing gas from the endothermic reaction of a carbonaceous material and steam in a gasification zone containing an alkali metal carbonate melt, oxidizing the unreacted carbonaceous material contained in the melt with an oxidant in an oxidation zone to provide exothermic heat of reaction to the melt and recirculating the heated melt to the gasification zone, the improvement which comprises: maintaining a concentration of from 0.4 weight percent to about 16 weight percent of sodium sulfate in the melt in the oxidation zone and reacting the carbonaceous material in the melt containing the sodium sulfate in the presence of a substantially pure fused alumina having a dense microstructure compound of between about 94 and about 96 weight percent corundum and between about 3 and about 6 weight percent beta-alumina, a density of about 220 pounds/cu. ft. and a Knoop hardness of about 2205, said alumina being present as a surface of the zone containing the reaction mixture.

References Cited
UNITED STATES PATENTS

| | | | |
|---|---|---|---|
| 2,654,661 | 10/1953 | Gorin | 48—202X |
| 2,840,462 | 6/1958 | Gorin | 48—202X |
| 3,252,773 | 7/1966 | Solomon et al. | 48—202 |

MORRIS O. WOLK, Primary Examiner

R. E. SERWIN, Assistant Examiner

U.S. Cl. X.R.

48—214, 206; 252—373, 440

PO-1050
(5/69)

UNITED STATES PATENT OFFICE
CERTIFICATE OF CORRECTION

Patent No. 3,567,412          Dated March 2, 1971

Inventor(s) Philip A. LeFrancois and Kenneth M. Barclay

It is certified that error appears in the above-identified patent and that said Letters Patent are hereby corrected as shown below:

Column 1, line 4, after "assignors" insert --one undivided half interest--; line 5, after "Chicago, I after the period (.) insert a comma (,) after which insert --one undivided half interest to Department of the Interio Government of the United States of America.--

Signed and sealed this 26th day of October 1971.

(SEAL)
Attest:

EDWARD M. FLETCHER, JR.
Attesting Officer

ROBERT GOTTSCHALK
Acting Commissioner of Pa